July 20, 1937.  J. POLNEY  2,087,298
AUTOMOBILE HEADLIGHT
Filed May 22, 1936  2 Sheets-Sheet 2
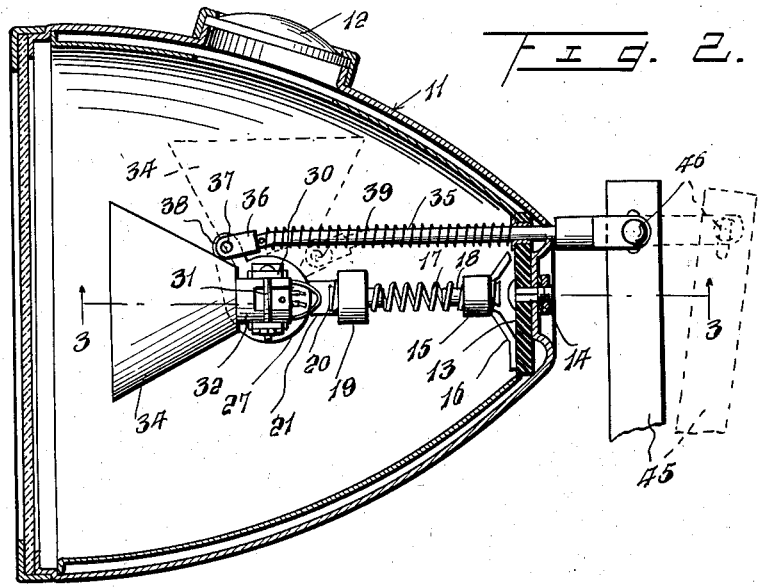
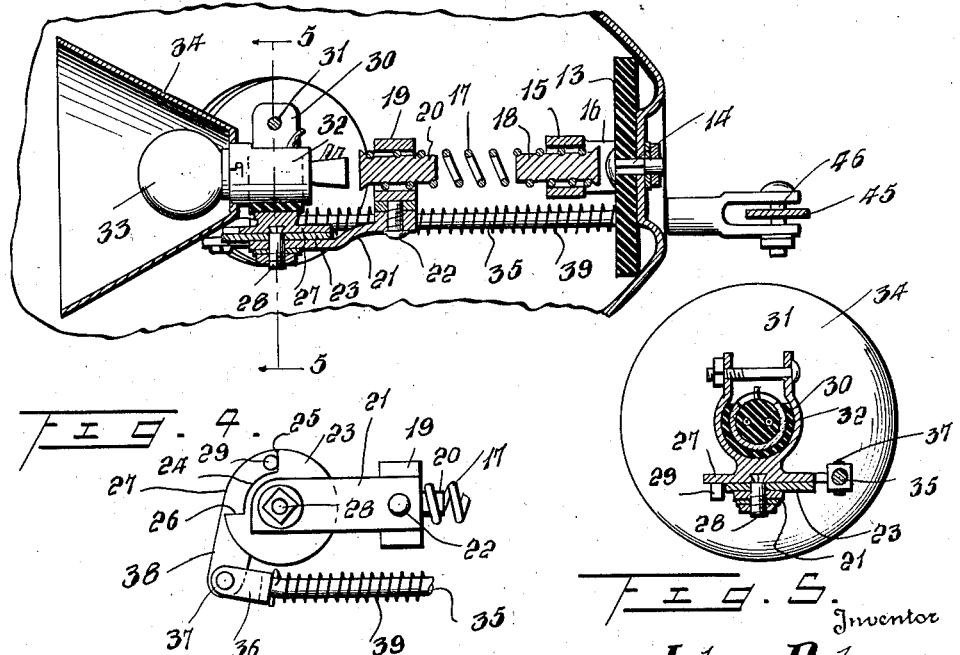
Inventor
John Polney Patented July 20, 1937

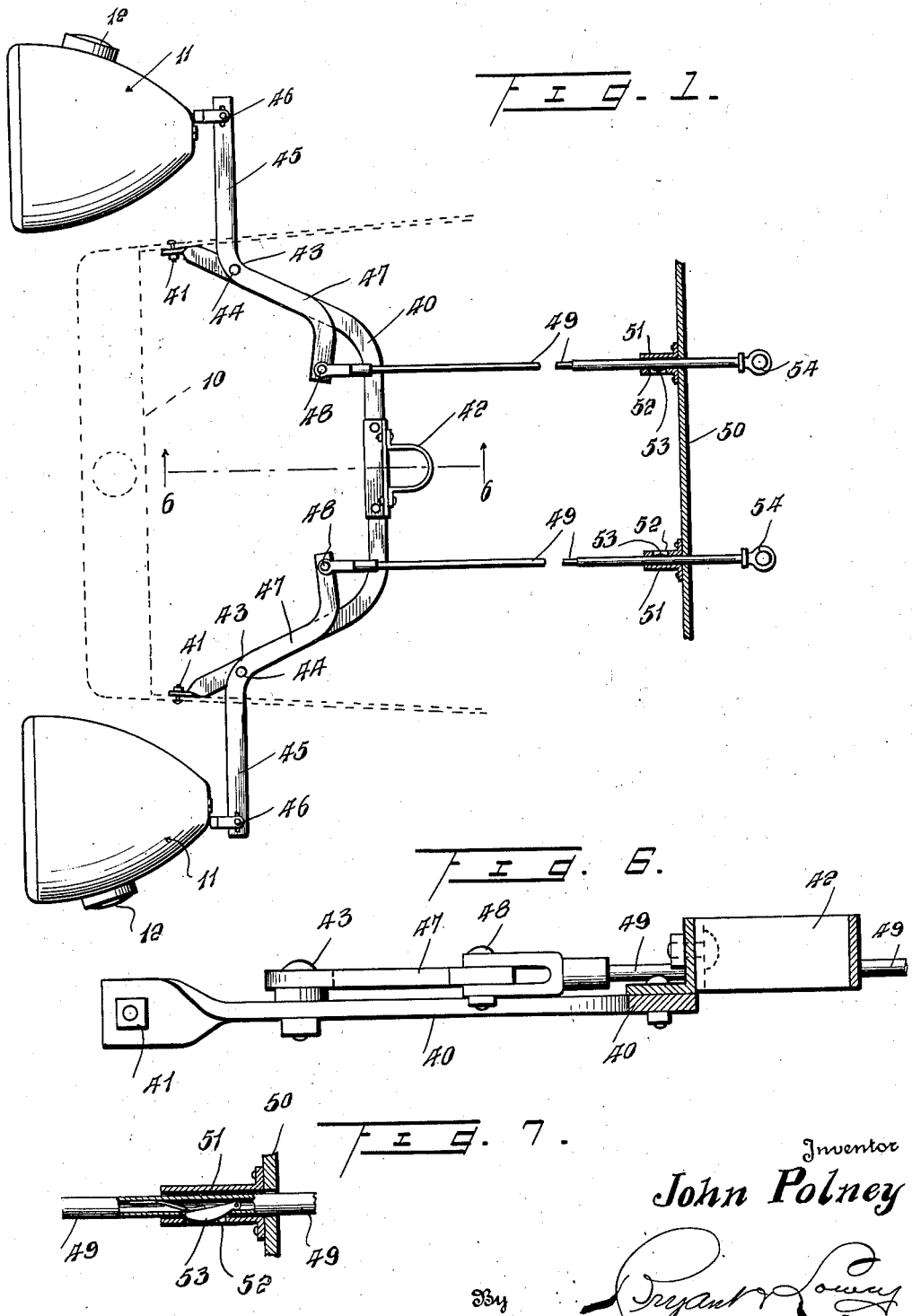

2,087,298

UNITED STATES PATENT OFFICE 2,087,298

AUTOMOBILE HEADLIGHT

John Polney, Elizabeth, N. J.

Application May 22, 1936, Serial No. 81,295

2 Claims. (Cl. 240—41.6)

This invention relates to certain new and useful improvements in automobile headlights.

The primary object of the invention is to provide headlights for automobiles wherein each headlight comprises a casing with a lens set into an opening at the outer side of the casing for the lateral or outward projection of light rays effected by means of a manually controlled adjustable light and reflector in the headlight casing to give a signal of a proposed turn or change in direction of travel to either the right or left.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary top plan view, partly in section, showing automobile headlights and operating devices for an adjustable light and reflector in each headlight casing, a part of the automobile radiator and hood being illustrated by dotted lines;

Figure 2 is a horizontal sectional view of one of the headlights having a light opening and lens in the outer side wall thereof and showing the adjustable light and reflector shifted to dotted line positions and directing light rays through the side opening;

Figure 3 is a detail sectional view taken on line 3—3 of Figure 2 showing the resilient mounting for the adjustable light and reflector and the operating means therefor;

Figure 4 is a fragmentary elevational view showing the devices for limiting movements of the light and reflector;

Figure 5 is a detail sectional view taken on line 5—5 of Figure 3;

Figure 6 is a detail sectional view taken on line 6—6 of Figure 1; and

Figure 7 is a detail sectional view showing the latch device for holding the operating rod for the adjustable light and reflector in shifted positions.

As shown in Figure 1, a part of an automobile radiator and hood is illustrated by the reference character 10 with a headlight 11 arranged at each side thereof, the headlights being supported by brackets in the usual manner, not illustrated. Each headlight has an opening in the outer side wall thereof with a lens 12 in the opening and each headlight carries an adjustable light and reflector with operating means therefor, whereby the light and reflector may be moved to a position to project light rays through a side lens 12 to indicate a proposed change in direction of travel of the vehicle.

One of the headlights with its adjustable light and reflector is shown in detail in Figures 2 to 5, the support for the adjustable light and reflector within the casing of the headlight 11 comprising an insulation base plate 13 anchored as at 14 to the smaller closed inner end wall of the headlight casing. A sleeve 15 is anchored to the forward side of the insulation plate 13 by means of a pair of oppositely directed arms 16 and one end of a relatively stiff coil spring 17 is anchored in the sleeve 15 by means of the inverted wedge pin 18. The other end of the coil spring 17 is rigidly mounted in a sleeve 19 by means of a wedge pin 20 and said sleeve 19 carries an arm 21 at one side thereof that is anchored thereto as at 22 and projects forwardly of the sleeve 19 as illustrated in Figures 3 and 4. A disk 23 is flatly engaged with one side of the forward end of the arm 21, being anchored to the arm and said disk is peripherally cut away as at 24 for a distance of 90° providing abutment shoulders 25 and 26. The disk 23 is horizontally disposed in the headlight casing as illustrated in Figures 2 and 3 and the adjustable light and reflector are mounted on the disk 23.

The adjustable light and reflector comprises a disk plate 27 axially pivoted to the disk 23 as at 28 and said disk 27 carries a facially projecting pin 29 extending into the cut-out portion 24 of the disk 23 for engagement with the abutment shoulders 25 and 26 for limiting movements of the disk 27 that carries the lamp and reflector. A two armed clamp 30 rises from the disk 27 with the free ends thereof secured together by the bolt and nut combination 31 and a lamp socket 32 is retained in the clamp 30 and insulated therefrom as illustrated in Figures 3 and 5. A lamp 33 is mounted in the socket 32 and a conical reflector 34 surrounding the lamp is mounted on the socket 32.

Separate operating means is provided for each of the pivotally mounted lights and reflectors and include a rod 35 extending through the rear closed end of the headlight casing 11 and the insulation plate 13 and having a clevis 36 at the inner forward end thereof that is pivotally mounted as at 37 upon an arm 38 projecting tangentially from the disk 27. A coil spring 39 surrounds the rod 35 between the insulation plate 13 and clevis 36 normally holding the rod 35 at its limit of forward movement as shown by full lines in Figure 2 with the stop pin 29 carried by the disk 27 engaged with the abutment shoulder 25 which positions the lamp and reflector in a position for casting light rays directly forwardly of the headlight casing 11. As shown in Figures 1 and 6, a bowed strap 40 is anchored at its ends as at 41 to a convenient part of the automobile body and carries an intermediate loop 42 for the further support thereof. A lever 43 is pivotally mounted as at 44 upon each end of the bowed strap 40 and each lever 43 has an outwardly directed arm 45 having a pin and slot connection 46 with the rear projecting end of the tensioned rod 35 as clearly shown in Figures 2 and 3. The other arm 47 of the lever 43 is pivotally attached as at 48 to the forward end of a push rod 49 that extends rearwardly for passage through the instrument board 50 of the automobile. A guide sleeve 51 is carried by the forward side of the instrument board 50 for each push rod 49 and has a side opening 52 therein for the reception of a tensioned latch 53 carried by the push rod 49 for holding the push rod in its adjusted position and therefore similarly holding the adjustable light and reflector in each headlight casing. Each push rod 49 carries an operating handle or knob 54. When a push rod 49 is projected forwardly, the lever 43 is moved on its pivotal mounting 44 for operating the tensioned rod 35 in the selected headlight casing, resulting in pivotal movement of the disk 27 upon the disk 23 for shifting a lamp 33 and its associated reflector 34 to the position illustrated by dotted lines in Figure 2 for casting light rays through a side lens 12 to indicate a proposed direction in change of travel, movement being limited by the stock pin 29 on the disk 27 engaging the abutment shoulder 26 on the disk 23. The light and reflector are retained in their shifted positions against the tension of the spring 35 by the latch 53 that is shifted out of the sleeve 51 and to be engaged with the forward end of the sleeve. When the push rod 49 is retracted, the latch 53 drops into the opening 52 in the sleeve 51 and the lamp 33 and associated reflector 34 are retained in the normal forward position.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In a headlight for automobiles, a casing having a light opening in the outer side wall thereof, an adjustable lamp and reflector pivotally supported in the casing and positioned for normally projecting light rays forwardly of the casing, the support for the lamp and reflector including a coiled spring supported at one end on the inner end of the casing, a bearing at the other end of the spring for the lamp and reflector and manually operable means for pivotally moving the lamp and reflector to project light rays through the outer side wall opening.

2. In a headlight for automobiles, a casing having a light opening in the outer side wall thereof, an adjustable lamp and reflector pivotally supported in the casing and positioned for normally projecting light rays forwardly of the casing, the support for the lamp and reflector including a coiled spring supported at one end on the inner end of the casing, a bearing at the other end of the spring for the lamp and reflector and manually operable means for pivotally moving the lamp and reflector to project light rays through the outer side wall opening including a tensioned rod in the casing having its forward end pivotally attached to the reflector and its rear end slidably extending through the rear end of the casing and a push rod and lever construction attached to the rear end of the tensioned rod.

JOHN POLNEY.